United States Patent Office 3,505,899
Patented Apr. 14, 1970

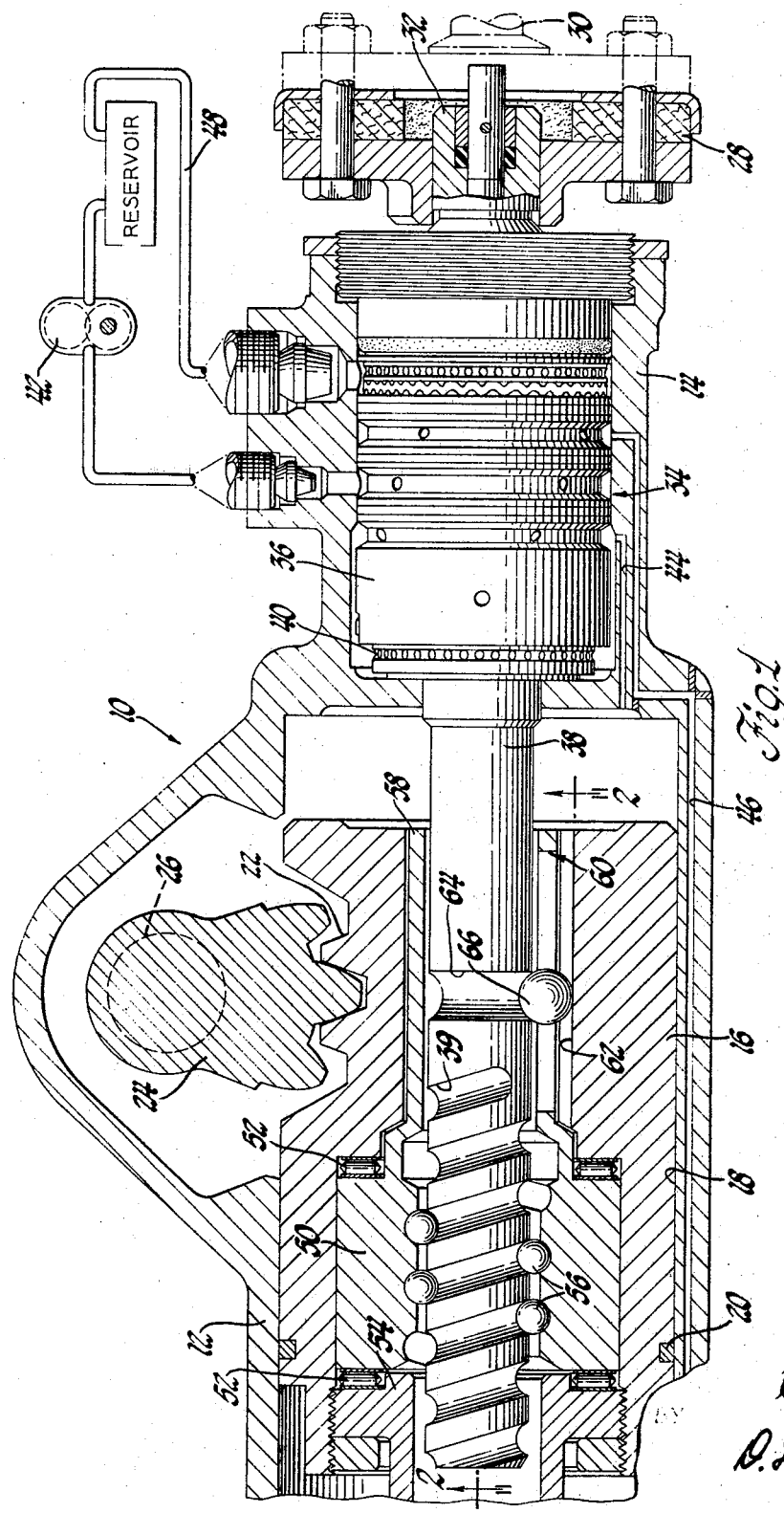

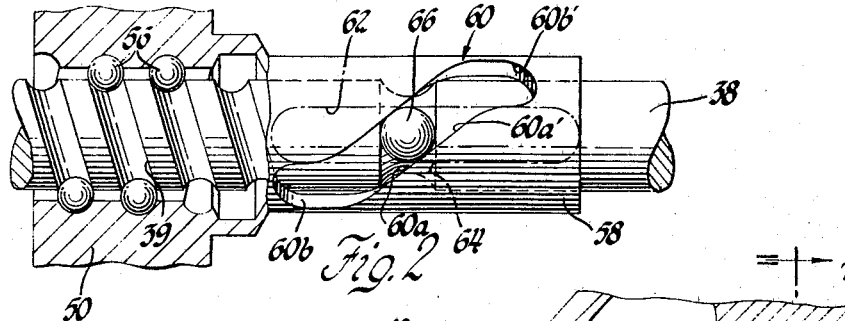
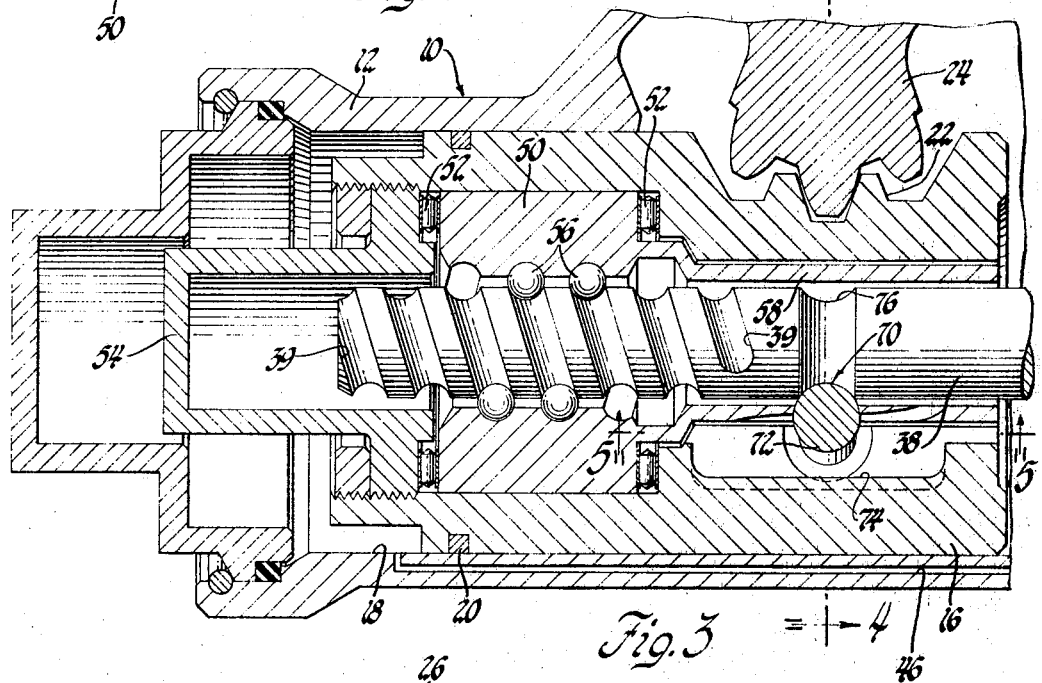
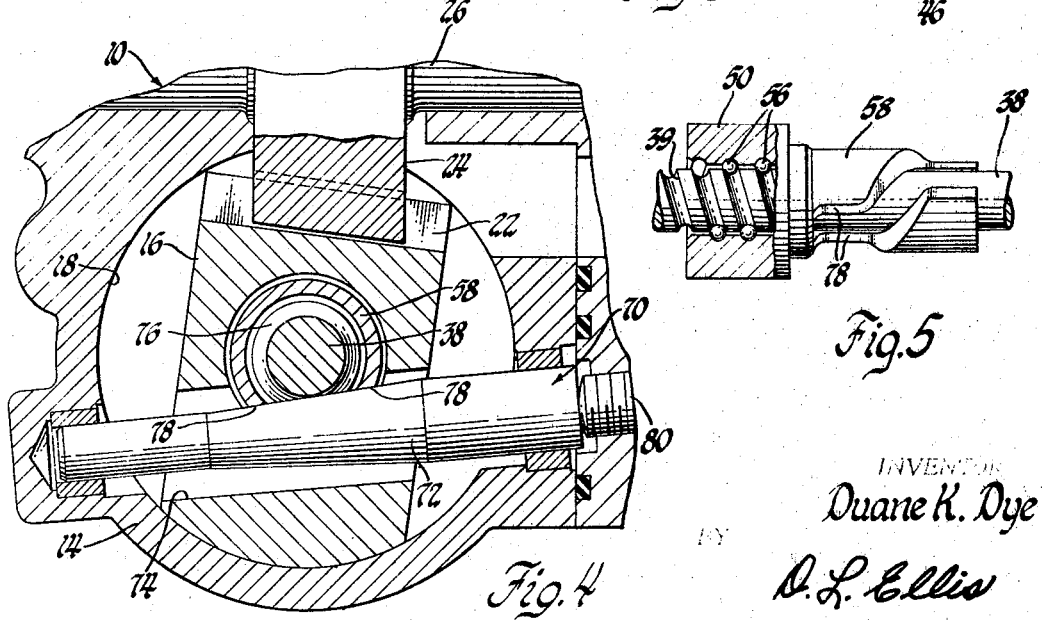
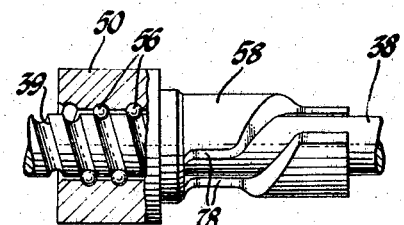

3,505,899
VARIABLE RATIO STEERING GEAR
Duane K. Dye, Saginaw, Mich., assignor to General Motors Corporation, Detroit, Mich., a corporation of Delaware
Filed Aug. 30, 1968, Ser. No. 756,512
Int. Cl. B62d 1/20
U.S. Cl. 74—499                                6 Claims

---

ABSTRACT OF THE DISCLOSURE

A variable ratio automotive steering gear unit includes a reciprocable input member formed with gear teeth meshing with cooperating gear teeth on an output sector driving the pitman shaft, and a constant lead screw engaged by a recirculating ball connection with a nut mounted within the input member in a manner providing unitary reciprocation of the nut with the input member but rotation of the nut about the axis of the screw relative to the input member. A lead modulating cam causes predetermined such relative rotation of the nut during its reciprocation unitarily with the input member whereby to modulate the linear displacement of such unit per increment of screw rotation to effect a variable reduction ratio between the screw rotation and the pitman shaft rotation.

---

My invention relates to improvements in automotive vehicle steering gears and particularly to improvements in variable ratio automotive steering gears of the type comprising a reciprocable recirculating ball nut or like input member drivingly engaged with a rotary output shaft.

A feature of the invention is in the use of such a reciprocating to rotary gear reduction steering unit wherein the reciprocating input member is linearly displaced by a constant lead screw operative upon the input member through a recirculating ball or like nut arranged for unitary reciprocation with the input member but for programmed rotation relative thereto to effect a variable linear displacement of the input member per increment of input rotation of the constant lead screw. A simply constructed and efficient lead modulating cam arrangement is provided for the programmed nut rotation and with which great flexibility in the variation of gear reduction ratio is achieved. The disclosed variable ratio gear structure is particularly useful in reciprocating to rotary gear reduction units of the type wherein force transmission gear teeth or like structure on the reciprocating input and rotary output members depend on a substantially fixed relationship therebetween precluding rocking of the input member about its axis during its reciprocation therealong.

These and other features and advantages of the invention will be readily apparent from the following specification and from the drawings wherein:

FIGURE 1 is a sectional view of an automotive vehicle power steering gear unit embodying the invention;

FIGURE 2 is a sectional view taken generally along the planes indicated by the lines 2—2 of FIGURE 1 illustrating a lead modulating cam formation for the recirculating ball nuts;

FIGURE 3 is a view similar to FIGURE 1 showing another embodiment according to the invention;

FIGURE 4 is a sectional view taken generally along the plane indicated by the lines 4—4 of FIGURE 3; and FIGURE 5 is a sectional view taken generally along the plane indicated by lines 5—5 of FIGURE 3 again illustrating a cam formation for the ball nut.

Referring now particularly to FIGURES 1 and 2 of the drawings, a first embodiment of the invention is disclosed in a so-called integral in-line type of hydraulic power assisted steering gear unit 10 including a housing having a first portion 12 for the integrated power piston and gear reduction assembly and a further housing portion 14 containing the hydraulic control valve for the unit. Referring first to the combined power piston and gear reduction unit, the same includes a reciprocating input member or power piston 16 slidable on the generally cylindrical wall 18 of housing portion 12 and sealed thereto at 20 to define at either side of the seal a fluid power assist chamber. In its presently disclosed embodiment, the input piston 16 is provided adjacent one end with a series of rack teeth 22 meshed with the teeth of an output sector 24 attached to or integrally formed with an output pitman shaft indicated at 26. The pitman shaft 26 is suitably journaled for rotation within housing portion 12 and to connect in conventional manner with the steering linkage for the vehicle dirigible wheels, all as well-known in the art. Rack teeth 22 and sector 24 may be formed for varying gear reduction ratio by virtue of varying pitch radius for the teeth of sector 24, as illustrated, or may be of constant ratio configuration, all as discussed with more particularity hereinbelow. As seen best in FIGURE 4 for the second embodiment, these teeth are tapered and provided with substantial width of face whereby the journaled pitman shaft holds the input piston against any substantial rocking about its axis while reciprocating.

At the right hand end of steering gear unit 10, a flexible steering shaft coupling 28 connects the usual steering shaft, indicated at 30, with an input stub shaft 32 extending to within the control valve of the gear unit designated generally as 34. Such valve structure 34 is of the rotary type including a pair of relatively rotatable valve elements the inner of which, not shown, is connected for unitary rotation with the stub shaft 32 and the outer of which or valve sleeve, designated 36, is connected for unitary rotation with a steering worm or screw shaft 38 mounted rotatively and axially fixed within housing portion 14 by suitable bearing structure including a needle roller bearing assembly 40.

Valve structure 34 generally accords with the disclosure of Patent No. 3,022,722 issued Feb. 22, 1962, to Zeigler et al., and attention is invited to that disclosure for the details of power steering operation which form no particular part of the present invention. Generally, however, valve structure 34 has suitable land and groove fluid porting configuration formed on the inner valve member in the outer valve sleeve 36 operative under relative rotation in either direction from a centered or neutral relation therebetween by rotation of the steering shaft 30 to direct pressurized fluid from a pump 42 to either of a pair of fluid passages 44 and 46 leading to the opposite chambers or sides of input piston 16, thereby to pressurize one side of the piston for the desired reciprocating displacement thereof to follow up the input rotation on the steering shaft and effect output rotation of the pitman shaft 26. Concurrently, the valve structure permits exhaust of the other fluid chamber through the other of passages 44 and 46 to a return line 48 leading to the fluid sump or reservoir from which the pump 42 draws. As also set out more fully in Zeigler et al., the two rotary valve members of valve structure 34 are structurally connected by yieldable centering means such as a torsion rod between the stub shaft 32 and the screw shaft 38 and flexible to permit only a limited amount of lost motion between these parts operative for the described power-assist pressurization and follow-up on the input piston 16. This lost motion is limited by suitable abutment structure operative to rigidly connect the stub shaft with the screw after a predetermined number of degrees of relative rotation between the valve members.

In the power-assist and reduction gear structure, screw shaft 38 extends through a central bore of input piston 16 for operative connection with a concentric ball nut 50. Ball nut 50 is rotatably mounted within an enlarged portion of the input piston bore by means of opposed needle roller bearings 52 seating on a shoulder of the input piston and on a closure cap member 54 threaded into the input piston and locked thereto by a jam nut. The ball nut is operatively connected to screw 38 by a constant lead helical ball groove 39 on the screw and a complementary internal groove in the nut engaged in well-known manner by an endless train of bearing balls 56. Under rotation of screw shaft 38 in either direction, the ball nut 50 and the input piston 16 reciprocate as a unit within housing portion 12, and vice versa, under pressurization of one side of input piston 16 by lost motion input rotation of the steering shaft 30, its follow-up reciprocation causes similar follow-up rotation of the screw shaft in a well-known manner. Ball nut 50 includes an extension 58 of cylindrical conformation extending through the central bore of the input piston and as seen best in FIGURE 2, such extension is provided with a generally helically shaped cam follower slot 60. Immediately below such cam follower slot, as the parts appear in FIGURE 1, is a longitudinally extending groove 62 in input piston 16 opening to the bore thereof. Screw 38 is provided with an annular groove 64 centered on a plane extending perpendicularly of the screw axis. A cam ball 66 is seated at opposite sides thereof in the groove 62 and the annular groove 64 and precisely fitted within the cam follower slot 60. Groove 62 holds the cam ball against movement laterally of the screw shaft axis, FIGURE 2, while groove 64 holds it against movement along such axis.

The relationship of the parts shown in FIGURES 1 and 2 is that which obtains in the centered or straight-ahead position of the vehicle dirigible wheels, and in such position cam ball 66 rests in a centered or mid-position of the follower slot 60. The follower slot is provided with a predetermined helical shape operative to impart a desired or programmed rotation of ball nut 50 about the axis of the screw shaft 38 relative to the input piston 16 during its unitary reciprocation therewith from the centered position shown to thereby alter or modulate the amount of unitary linear displacement of the ball nut and the input piston per increment of screw rotation. Accordingly, the gear reduction ratio in the gear unit reflecting the amount of screw rotation for each increment of rotation of the pitman shaft is provided with the desired variation through the linear travel range of the input piston. As an example, with the constant lead right hand groove 39 of the screw shaft 38 specifically shown herein, the follower slot 60 is shown as being shaped to provide for a decreasing gear reduction ratio ranging from a high or "slow steer" ratio at and adjacent the straightahead position of the dirigible wheels to a low or "fast steer" at an adjacent either of the full turn or lock positions of the wheels. Considering a rotation of screw shaft 38 in one direction from center causing linear displacement of the ball nut 50 to the right in FIGURE 2 for a right turn of the dirigible wheels, it is seen that such linear displacement causes slot 60 to follow cam ball 66 so that the ball nut 50 is not only reciprocated but also rotated on screw shaft 38 in the same direction of rotation so that the ball nut advances on the right-hand groove of the screw shaft a lesser linear distance than would result merely by the lead of the groove; in other words, the combined linear and rotary displacement of such ball nut on the screw causes the ball nut to "lag" the lead of the screw rotation the desired amount per increment of such screw rotation. This thus results in an overall lesser amount of ball nut and input piston linear displacement per increment of screw rotation than that which would arise merely by the lead of the screw in those areas of ball nut and input piston linear travel in which a "slower" or higher gear reduction ratio of screw rotation versus output rotation of the pitman shaft 26 is desired.

The shape of the slot may of course be selected to impart a modulated constant ratio, or a constantly changing ratio; i.e., a ratio curve falling off at a constant rate per increment of pitman displacement off-center, or may be shaped to provide a varying rate of change of ratio. It is of course recognized that should the slot 60 be shaped in any portion thereof to have its axis extending purely longitudinally or axially of the parts parallel with the axis of screw 38, the gear reduction ratio is that which corresponds simply to the lead of screw shaft groove 39, since no cammed rotation of ball nut 50 will result. This is illustrated in FIGURE 2 at portion 60b of follower slot 60 corresponding to the area of dirigible wheel displacement at and adjacent a full right turn. It is thus seen, by way of further description of the instant embodiment, that with ball 66 located in this follower slot portion 60b and with screw shaft rotation moving ball nut 50 and the input piston leftwardly toward the centered position shown, such portion 60b holds the ball nut against simultaneous rotation until the helical portion 60a of the slot reaches the ball. This letter portion 60a then causes cammed rotation of the ball nut in the same direction as the screw shaft rotation, at a varying rate per increment of the latter up to a maximum rate preferably at and adjacent the centered position. Such rotation on the ball nut causes it and the input piston to of course "lag" the lead of screw groove 39 a varying amount so that the ratio or mechanical advantage in the gear unit increases from the low value in slot portion 60b through the progressively higher and maximum values in portion 60a.

It is believed apparent that, for symmetry with the right turn region, input rotation on screw shaft 38 in a direction moving ball nut 50 and the input piston to the left from center in FIGURE 2 for a left turn at the dirigible wheels results in continued cammed rotation of the ball nut 50 by a helical slot portion 60a' in a direction effecting "lagging" higher ratios at and adjacent the centered regions of the slot 60 constantly or otherwise decreasing to a low ratio reflecting only the screw groove lead in a portion 60b', wherein there is no cammed rotation of the ball nut.

In FIGURES 3 and 4, there is disclosed an alternative embodiment of the invention similar in most respects to that previously described and with like reference numerals referring to like parts. Rather than the cam ball with its cooperating annular groove in the screw and axially extending groove in the input piston cooperating for fixed location of the cam ball, there is instead provided a tapered cam pin 70 fixedly mounted at both ends for rotation in bushings in the housing portion 14 of gear unit 10, seen best in FIGURE 4. Intermediate the two mounted end portions of such pin, there is a tapered or frustoconical camming portion 72, and it is seen that the pin 70 is located within an elongated axially extending slot 74 in the input piston 16 to have such camming portion 72 firmly engaged with a complementarily shaped annular groove 76 in the screw 38 similar to that shown for the previous embodiment. At either side of its contact with the groove 76, the camming portion 72 engages with contoured cam follower surfaces 78 on ball nut extension 58 provided by milling chordwise through the thickness of such extension at predetermined varying angular relation along the length of the extension to form a slot therein such as appears in FIGURE 5. Again, the follower surfaces 78 are formed in a generally helical fashion to provide for the desired cammed rotation of the ball nut 50 within the input piston 16 to effect variable linear displacement thereof per increment of screw rotation either side of the centered position shown. Preferably, for full flush relation between pin 70 and follower surfaces 78, pin 70 is installed with some amount of preload or wedge-like engagement within the annular groove 76 and against the follower surfaces by selected axial displacement of the pin under adjustment of the preload set screw 80 threaded into housing portion 14 and bearing against the upper end of the pin. Should wear develop on the pin camming portion 72 and the follower surfaces 78 during prolonged periods of use, the set screw may be accordingly adjusted for proper wedging engagement between these parts.

It will be appreciated that the invention contemplates many types of variable gear reduction ratio characteristics including an increasing ratio such as may be desired for use with a purely manual of nonpower-assisted steering gear. With the latter, the follower slot 60 or follower surfaces 78 may be generally reversed to an opposite hand of helical shape so that rather than causing the ball nut 50 to rotate in a manner advancing it on the screw shaft 38 in lagging or decelerated fashion, the ball nut will be rotated in the opposite direction from screw rotation to cause it to "overlead" and thereby accelerate the amount of linear travel of the ball nut and input piston under the screw rotation to change from a high ratio adjacent lock positions to a reduced ratio oncenter. Alternatively, of course, both the decreasing power-assisted ratio characteristic and the manual gear increasing ratio characteristic may be accomplished in a reverse manner from that herein described by having the oncenter ratio value selected to correspond with merely the screw groove lead and contouring the slot 60 or surfaces 78 appropriately to modulate this screw lead for the decreasing or increasing values toward either lock position. It is also to be appreciated that further variable ratio gear reduction may be provided, as previously indicated, by utilization of varying pitch radius on the teeth of sector 24, thereby to complement the ratio change imparted by the camming of the ball nut 50. The teeth of the sector and the complementary rack teeth 22 may thus be formed for increasing ratio off-center in the manner disclosed in Phelips U.S. 2,159,225 or alternatively as specifically shown in the drawings herein, an opposite form of teeth may be utilized for a decreasing ratio off-center and following generally the disclosure of Lincoln 2,953,932.

As a specific example for the construction of the cam and cam follower formation, there is tabulated below the pertinent data for a particular decreasing ratio characteristic for gear 10 in which the lead for screw groove 39 is .6885 inch and the pitch radius for the teeth of sector 24 is a constant 1.315 inches.

TABLE

| Steering shaft rotation from center, degree | Angular displacement of nut, degree | Linear displacement of nut and piston from center, inches | Pitman shaft rotation from center, degree | Ratio |
|---|---|---|---|---|
| 0 | 0 | 0 | 0 | 18.00 |
| 15 | 5 | .0191 | .833 | 18.00 |
| 30 | 10 | .0383 | 1.677 | 17.99 |
| 45 | 15 | .0576 | 2.511 | 17.80 |
| 60 | 19.7 | .077 | 3.355 | 17.24 |
| 75 | 24 | .0975 | 4.25 | 16.36 |
| 90 | 27.7 | .1193 | 5.197 | 15.48 |
| 105 | 30.7 | .142 | 6.17 | 14.70 |
| 120 | 33.2 | .1655 | 7.21 | 14.10 |
| 135 | 35.2 | .190 | 8.29 | 13.63 |
| 150 | 36.8 | .216 | 9.41 | 13.24 |
| 165 | 38.03 | .2426 | 10.568 | 12.9 |
| 180 | 38.91 | .2698 | 11.755 | 12.59 |
| 195 | 39.46 | .2975 | 12.96 | 12.32 |
| 210 | 39.73 | .326 | 14.2 | 12.13 |
| 225 | 39.81 | .354 | 15.44 | 12.02 |
| 232 | 39.82 | .367 | 16.0 | 12.00 |
| 240 | 39.82 | .382 | 16.67 | 12.00 |
| 300 | 39.82 | .497 | 21.67 | 12.00 |
| 360 | 39.82 | .611 | 26.67 | 12.00 |
| 420 | 39.82 | .726 | 31.67 | 12.00 |
| 480 | 39.82 | .841 | 36.67 | 12.00 |
| 540 | 39.82 | .955 | 41.67 | 12.00 |
| 600 | 39.82 | 1.070 | 46.67 | 12.00 |

Having thus described the invention, what is claimed is:

1. A variable ratio steering gear comprising a rotatable output member, an input member reciprocable along an axis, means connecting said members for effecting rotation of said output member under reciprocation of said input member, said input member being held against substantial rotation about its said axis during reciprocation therealong, input screw means of constant lead, nut means engaged on said screw means for reciprocation thereby, means connecting said nut means with said input member for reciprocation as a unit therewith and for rotation of said nut means about the axis of said screw means relative to said input member, and lead modulating means connected with said nut means for effecting variable reciprocating displacement thereof with said input member per increment of rotation of said constant lead screw means by predetermined rotation of said nut means about the axis of said screw means relative to said input member during said unitary reciprocation therewith.

2. A variable ratio steering gear comprising a housing, an output shaft journaled for rotation in said housing, an input member mounted in said housing for reciprocation along an axis, force transmission means on said shaft and said input member for effecting rotation of said shaft under reciprocation of said input member, said input member being held against substantial rotation about its said axis during reciprocation therealong to maintain said force transmission means active in generally fixed planes of reciprocation of said input member, input screw means of constant lead, a nut mounted rotatably on said input member and engaged on said screw means for reciprocation thereby, said nut and said input member being reciprocable as a unit by said screw means and said nut being rotatable about the axis of said screw means relative to said input member, and lead modulating means including cam means fixedly located in said housing and engaged with follower means on said nut for effecting variable reciprocating displacement of the latter with said input member per increment of rotation of said constant lead screw means by cammed rotation of said nut about the axis of said screw means relative to said input member during said unitary reciprocation therewith.

3. The combination of claim 2 wherein said force transmission means include gear teeth formed with varying pitch radius.

4. A variable ratio steering gear comprising a housing, an output shaft journaled for rotation in said housing, a reciprocable input member in said housing, force transmission means on said shaft and said input member for effecting rotation of said shaft under reciprocation of said input member, a nut rotatably mounted within said input member, input screw means of constant lead axially fixedly mounted on said housing for rotation therein and extending to within said nut for operative connection therewith, said nut and said input member being reciprocable as a unit by said screw means and said nut being rotatable about the axis of said screw means relative to said input member, a cam ball engaged within an annular groove in said screw means against axial displacement relative thereto and within a groove in said input member extending in the direction of reciprocation thereof and operative to prevent displacement of said cam ball about the screw means axis, said cam ball being further engaged with a follower groover in said nut cooperative with said cam ball to effect variable reciprocating displacement of said nut with said input member per increment of rotation of said constant lead screw means by cammed rotation of said nut about the axis of said screw means relative to said input member during said unitary reciprocation therewith.

5. A variable ratio steering gear comprising a housing, an output shaft journaled for rotation in said housing, a reciprocable input member in said housing, force transmission means on said shaft and said input member for effecting rotation of said shaft under reciprocation of said input member, a nut mounted rotatably within said input member, input screw means of constant lead engaged within said nut, said nut and said input member being reciprocable as a unit by said screw means and said nut being rotatable about the axis of said screw means relative to said input member, and lead modulating means including a cam pin mounted on said housing and extending within said input member for engagement with follower surface means on said nut, said cam pin and said follower surface means being cooperative to effect variable reciprocating displacement of said nut and said input member per increment of rotation of said constant lead screw means by predetermined rotation of said nut about the axis of said screw means relative to said input member during said unitary reciprocation therewith.

6. A variable ratio steering gear according to claim 5 wherein said cam pin is of tapered configuration and further including cam pin preloading means on said housing operative for positional adjustment of said cam pin along its axis on said follower surface means.

References Cited

UNITED STATES PATENTS 3,250,147  5/1966  Barton et al. _____ 74—509

MILTON KAUFMAN, Primary Examiner